(12) United States Patent
Tyner et al.

(10) Patent No.: US 6,986,034 B2
(45) Date of Patent: Jan. 10, 2006

(54) SETTING A SYSTEM INDICATION IN RESPONSE TO A USER WHEN EXECUTION OF THE SYSTEM SETUP PROGRAM IS DESIRED

(75) Inventors: Benjamen G. Tyner, Austin, TX (US); Andy W. Wong, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 560 days.

(21) Appl. No.: 10/120,803

(22) Filed: Apr. 11, 2002

(65) Prior Publication Data

US 2003/0196079 A1      Oct. 16, 2003

(51) Int. Cl.
*G06F 15/177* (2006.01)
*G06F 11/00* (2006.01)

(52) U.S. Cl. ................................. 713/2; 713/1; 714/36
(58) Field of Classification Search ............... 713/2, 713/1, 100; 714/2, 15, 25, 30, 36
See application file for complete search history.

(56) References Cited

U.S. PATENT DOCUMENTS

| | | | |
|---|---|---|---|
| 6,202,160 B1 | 3/2001 | Sheikh et al. | 713/310 |
| 6,272,626 B1 | 8/2001 | Cobbett | 713/2 |
| 6,317,826 B1 | 11/2001 | McCall et al. | 713/1 |
| 6,330,690 B1 | 12/2001 | Nouri et al. | 714/23 |
| 6,347,371 B1 | 2/2002 | Beelitz et al. | 713/2 |
| 6,640,316 B1 * | 10/2003 | Martin et al. | 714/36 |
| 6,732,267 B1 * | 5/2004 | Wu et al. | 713/100 |

\* cited by examiner

*Primary Examiner*—Thomas Lee
*Assistant Examiner*—Suresh K Suryawanshi
(74) *Attorney, Agent, or Firm*—Hamilton & Terrile, LLP; Stephen A. Terrile

(57) ABSTRACT

The present invention provides a method of executing a system setup program in an information handling system which includes setting a system setup indication during operation of the information handling system. The system setup indication is persistent and reboots the information handling system. The system setup indication indicates a desire for the information handling system to execute the system setup program and executes the system setup program if the system setup indication so indicates. The invention relates to an information handling system which includes a processor, a memory coupled to the processor, and a basic input output system (BIOS) stored on the memory. The memory includes a volatile portion and a non-volatile portion. The non-volatile portion includes a storage location for a system setup indication. The basic input output system (BIOS) examines the system setup indication during booting of the information handling system and determines whether the information handling system should execute a system setup program. Further, the invention relates to an apparatus for executing a system setup program in an information handling system. The information handling system includes setting a system setup indication during operation of the information handling system. The system setup indication is persistent and reboots the information handling system. The system setup indication indicates a desire for the information handling system to execute the system setup program and executes the system setup program if the system setup indication so indicates.

21 Claims, 2 Drawing Sheets

SETTING A SYSTEM INDICATION IN RESPONSE TO A USER WHEN EXECUTION OF THE SYSTEM SETUP PROGRAM IS DESIRED

FIELD OF THE INVENTION

The present invention relates to information handling systems, and more particularly to system setup of information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Initiating operation of a computer system is referred to as "booting" (or "rebooting") the computer system. The computer system is booted in response to an event ("boot event"). Such a boot event may be, for example, a user "turning on" the computer system (e.g. the user causing application of electrical power to the computer system by switching an on/off button of the computer system). Alternatively, such a boot event may be receipt by the computer system of a command to initially execute the operating system software. For example, the computer system may receive such a command from the user (e.g. through an input device), or from a computer application executed by the computer system, or from another computer system (e.g. through a network).

In response to a boot event, the computer system initiates execution of software (e.g. operating system software such as Microsoft Windows). The computer system may read the software from a computer-readable medium, such as a hard disk or a floppy diskette. During the booting of the computer system and prior to execution of the operating system, the computer system may enter a system setup program. The system setup program is a program recorded as part of the basic input-output system (BIOS) that changes the setup options of the computer system. The setup program is executed by actuating a special key combination (usually shown on screen) as the computer system boots up. To execute the system setup program, it is important to actuate the key combination at the appropriate time during power on self test (POST). After the time has passed, then the computer system initiates the execution of the software and to execute the system setup program it is generally necessary to reboot the computer system.

SUMMARY OF THE INVENTION

In one embodiment, the present invention provides a method of executing a system setup program in an information handling system which includes setting a system setup indication during operation of the information handling system. The system setup indication is persistent and reboots the information handling system. The system setup indication indicates a desire for the information handling system to execute the system setup program and executes the system setup program if the system setup indication so indicates.

In another embodiment, the invention relates to an information handling system which includes a processor, a memory coupled to the processor, and a basic input output system (BIOS) stored on the memory. The memory includes a volatile portion and a non-volatile portion. The non-volatile portion includes a storage location for a system setup indication. The basic input output system (BIOS) examines the system setup indication during booting of the information handling system and determines whether the information handling system should execute a system setup program.

In another embodiment, the invention relates to an apparatus for executing a system setup program in an information handling system. The information handling system includes setting a system setup indication during operation of the information handling system. The system setup indication is persistent and reboots the information handling system. The system setup indication indicates a desire for the information handling system to execute the system setup program and executes the system setup program if the system setup indication so indicates.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
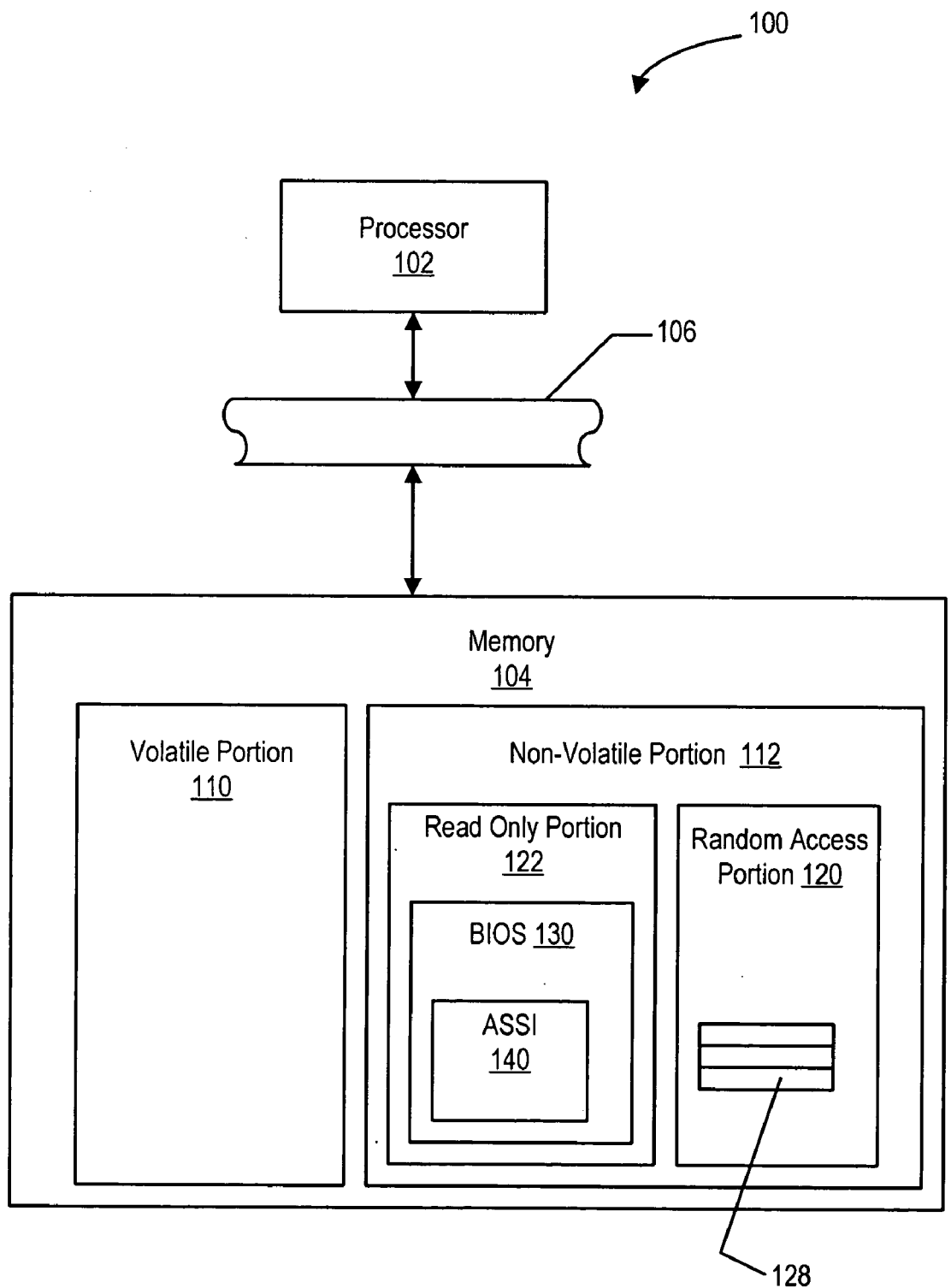
FIG. 1 shows a block diagram of an information handling system in accordance with the present invention.

Referring to FIG. 1, an information handling system 100, such as a computer system, includes a processor 102 coupled to a memory 104 via a bus 106. The memory 104 includes a volatile portion 110 as well as a non-volatile portion 112. The non-volatile portion 112 includes a random access portion 120 (e.g., a non-volatile random access memory (NVRAM)) as well as a read only portion 122 (e.g., a read only memory ROM). The non-volatile random access portion 120 may include a plurality of persistent storage locations 128. The read only portion 122 includes a basic input output system (BIOS) 130 for the information handling system 100.

BIOS 130 includes the system programs for the basic input and output operations and represents the software interface to the hardware of the computer system. BIOS 130 includes automated system setup entry module 140 which allows a user to automatically access the system setup program.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
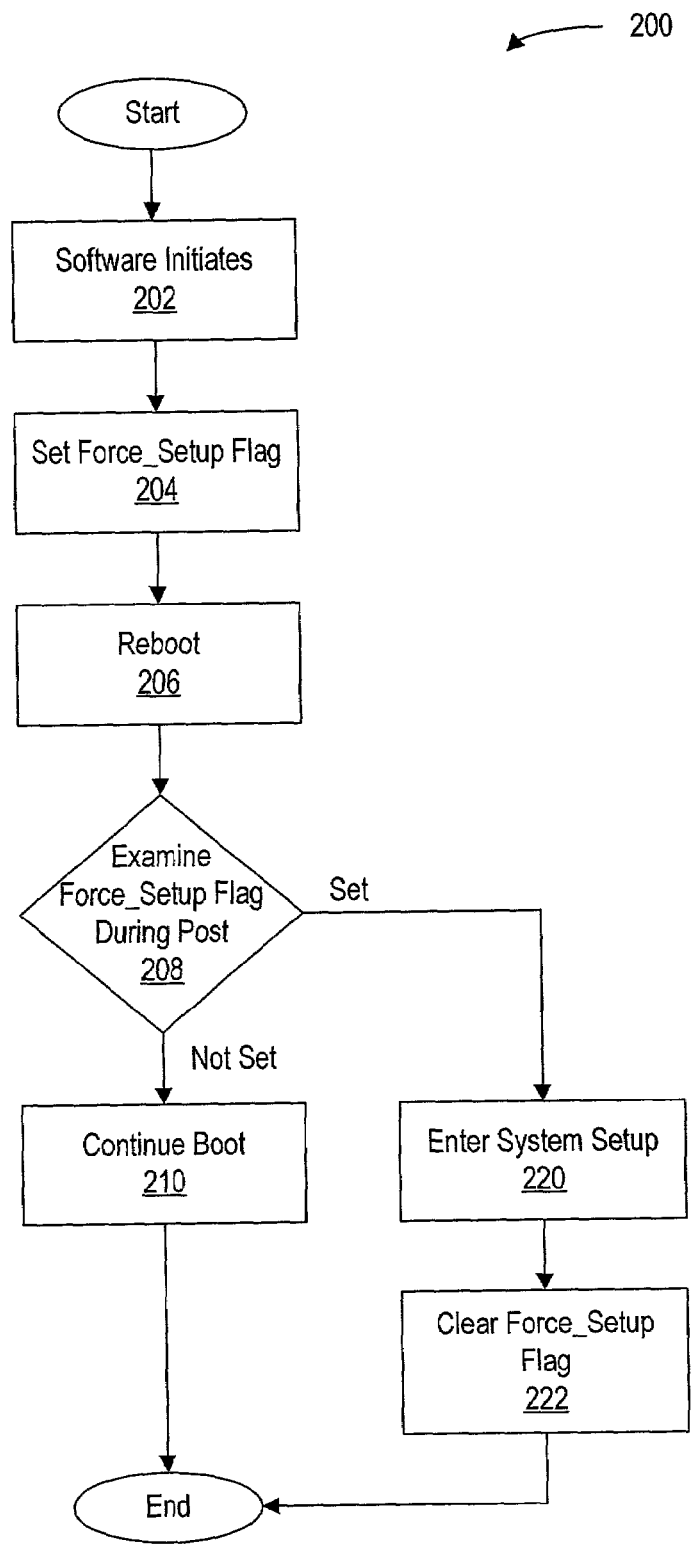
FIG. 2 shows a flow chart of the automated system setup entry system in accordance with the present invention.

Referring to FIG. 2, the automated system setup entry module 140 starts by a user indicating a desire to enter system setup at step 202. When the user so indicates, then a force_setup flag is set at step 204, e.g., by the operating system of the information handling system 100. After the flag is set, then the information handling system is rebooted at step 206, e.g., by the operating system requesting a reboot. This reboot may be immediately after the flag is set or at some time in the future. After the information handling system 100 reboots, then during the boot process, the force_setup flag is examined at step 208 to determine whether the force_setup flag is set. If the force_setup flag is not set then the information handling system 100 continues to boot at step 210.

If the force_setup flag is set, then the information handling system executes the system setup program at step 220, thus entering system setup. After system setup is entered, then the information handling system 100 clears the force_setup flag at step 222, via e.g., the BIOS 130, and then completes the execution of the automated system setup entry module 140.

Other Embodiments

Other embodiments are within the following claims.

For example, the force_setup flag is one example of a system setup indication that may be used by the information handling system 100 to determine whether to execute the system setup program. Other such indications are within the scope of the claims.

Also for example, while the automated system startup entry module is shown as part of the BIOS, it will be appreciated that the automated system startup entry module may be located elsewhere within an information handling system.

Also for example, while the automated system startup entry module is initiated via the operating system of the information handling system, it will be appreciated that the automated system startup entry module may be initiated elsewhere within the information handling system.

What is claimed is:

1. A method of executing a system setup program in an information handling system comprising setting a system setup indication in response to a user during operation of the information handling system, the system setup indication being persistent, the system setup indication indicating whether to execute the system setup program;

rebooting the information handling system;

determining whether the system setup indication indicates a desire for the information handling system to execute the system setup program; and, executing the system setup program if the system setup indication so indicates, the executing the system setup program enabling changing setup options of the information handling system, the system setup program being executed prior to execution of an operating system.

2. The method of claim 1 further comprising:

clearing the persistent system setup indication after the system setup program executes.

3. The method of claim 1 wherein the determining is performed by a basic input output system (BIOS) of the information handling system.

4. The method of claim 1 wherein the determining is performed during a power on self test (POST) operation.

5. The method of claim 1 wherein the system setup indication is a force setup flag.

6. The method of claim 1 wherein the system setup indication is stored in non-volatile memory of the information handling system.

7. The method of claim 1 wherein the system setup indication is set via software by an operating system executing on the information handling system.

8. The method of claim 7 wherein the operating system causes the rebooting upon setting of the system setup indication.

9. An information handling system comprising a processor;

a memory coupled to the processor, the memory including a volatile portion and a non-volatile portion, the non-volatile portion including a storage location for a system setup indication, the system setup indication indicating whether to execute a system setup program;

a basic input output system (BIOS) stored on the memory, the BIOS examining the system setup indication during booting of the information handling system to determine whether the information handling system should execute the system setup program, executing the system setup program enabling changing setup options of the information handling system, the system setup program being executed prior to execution of an operating system, the operating system setting the system setup indication in response to a user when execution of the system setup program is desired.

10. The information handling system of claim 9 wherein:

the BIOS clears the persistent system setup indication after the system setup program executes.

11. The information handling system of claim 9 wherein the BIOS examines the system setup indication during a power on self test (POST) operation.

12. The information handling system of claim 9 wherein the system setup indication is a force setup flag.

13. The information handling system of claim 9 wherein the system setup indication is stored in the non-volatile memory portion of the memory.

14. An apparatus for executing a system setup program in an information handling system comprising
- means for setting a system setup indication in response to a user during operation of the information handling system, the system setup indication being persistent, the system setup indication indicating whether to execute the system setup program;
- means for rebooting the information handling system;
- means for determining whether the system setup indication indicates a desire for the information handling system to execute the system setup program; and,
- means for executing the system setup program if the system setup indication so indicates, the system setup program enabling changing setup options of the information handling system, the system setup program being executed prior to execution of an operating system.

15. The apparatus of claim 14 further comprising:
means for clearing the persistent system setup indication after the system setup program executes.

16. The apparatus of claim 14 wherein
the means for determining includes a basic input output system (BIOS) of the information handling system.

17. The apparatus of claim 14 wherein
the means for determining operates during a power on self test (POST) operation.

18. The apparatus of claim 14 wherein
the system setup indication is a force setup flag.

19. The apparatus of claim 14 wherein
the system setup indication is stored in non-volatile memory of the information handling system.

20. The apparatus of claim 14 wherein
the system setup indication is set via software by an operating system executing on the information handling system.

21. The apparatus of claim 20 wherein
the operating system causes the rebooting upon setting of the system setup indication.

* * * * *